(12) United States Patent
Alonso-Miralles

(10) Patent No.: US 11,767,124 B2
(45) Date of Patent: Sep. 26, 2023

(54) AIRCRAFT PROPULSION SYSTEM WITH VARIABLE AREA INLET

(71) Applicant: Rohr, Inc., Chula Vista, CA (US)

(72) Inventor: Jose S. Alonso-Miralles, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/472,120

(22) Filed: Sep. 10, 2021

(65) Prior Publication Data
US 2023/0080020 A1    Mar. 16, 2023

(51) Int. Cl.
B64D 33/02    (2006.01)
F02C 7/042    (2006.01)

(52) U.S. Cl.
CPC .............. B64D 33/02 (2013.01); F02C 7/042 (2013.01)

(58) Field of Classification Search
CPC ................................. B64D 33/02; F02C 7/042
See application file for complete search history.

(56) References Cited

U.S. PATENT DOCUMENTS

| | | | |
|---|---|---|---|
| 2,677,232 A | 5/1954 | Whitney | |
| 2,876,621 A | 3/1959 | Bogert | |
| 2,955,414 A | 10/1960 | Hausmann | |
| 3,058,693 A | 10/1962 | Doak | |
| 3,172,253 A | 3/1965 | Schelp | |
| 3,176,462 A | 4/1965 | Eckert | |
| 3,199,810 A | 8/1965 | Stroud | |
| 3,495,605 A | 2/1970 | Gunnarson | |
| 3,618,876 A | 11/1971 | Skidmore | |
| 3,664,612 A | 5/1972 | Skidmore | |
| 3,974,648 A | 8/1976 | Kepler | |
| 4,007,891 A | 2/1977 | Sorensen | |
| 4,132,240 A | 1/1979 | Frantz | |
| 4,174,083 A * | 11/1979 | Mohn | B64D 33/02 137/15.1 |
| 4,343,506 A * | 8/1982 | Saltzman | B62D 35/001 296/180.2 |
| 4,620,679 A | 11/1986 | Karanian | |
| 5,014,933 A | 5/1991 | Harm | |

(Continued)

FOREIGN PATENT DOCUMENTS

FR    3023586    7/2016
WO    2009115674 A2    9/2009

OTHER PUBLICATIONS

EP search report for EP22194970.4 dated Feb. 10, 2023.

*Primary Examiner* — Lorne E Meade
(74) *Attorney, Agent, or Firm* — Getz Balich LLC

(57) ABSTRACT

An assembly is provided for an aircraft propulsion system. This assembly includes a variable area inlet. The variable area inlet includes a moveable structure configured to move axially along an axial centerline between a first position and a second position. The variable area inlet is configured to open an airflow inlet passage into the aircraft propulsion system when the movable structure is in the first position. The variable area inlet is configured to close the airflow inlet passage when the movable structure is in the second position. The airflow inlet passage includes an inlet. The inlet extends axially along the axial centerline from a first end to a second end. A distance from the first end to the second end changes as the inlet extends laterally between a first side and a second side.

16 Claims, 9 Drawing Sheets

(56) References Cited

U.S. PATENT DOCUMENTS

| | | | |
|---|---|---|---|
| 5,088,660 A | 2/1992 | Karanian | |
| 5,513,591 A * | 5/1996 | Quartarone | B63B 13/02 |
| | | | 114/337 |
| 5,881,758 A | 3/1999 | Koncsek | |
| 6,276,632 B1 | 8/2001 | Sanders | |
| 6,793,175 B1 | 9/2004 | Sanders | |
| 7,837,142 B2 | 11/2010 | Chase | |
| 8,024,935 B2 * | 9/2011 | Hoover | F02K 3/06 |
| | | | 60/785 |
| 8,181,905 B2 | 5/2012 | McDonough et al. | |
| 8,403,264 B2 * | 3/2013 | Schiek | B64D 13/00 |
| | | | 244/129.4 |
| 8,690,097 B1 | 4/2014 | Huynh | |
| 9,803,546 B2 * | 10/2017 | Willie | F04D 29/584 |
| 9,908,633 B2 | 3/2018 | Huynh | |
| 10,107,196 B2 | 10/2018 | Devine | |
| 10,221,764 B2 | 3/2019 | Labrecque | |
| 10,308,368 B2 | 6/2019 | Pastouchenko | |
| 10,385,777 B2 * | 8/2019 | Jen | F01D 9/02 |
| 11,441,482 B2 * | 9/2022 | Lacko | B64D 33/02 |
| 11,486,306 B2 * | 11/2022 | Klovdahl | B64D 33/02 |
| 2017/0158341 A1 | 6/2017 | Kawai | |
| 2017/0321633 A1 | 11/2017 | Boileau | |
| 2018/0283276 A1 | 10/2018 | Todorovic | |
| 2018/0371996 A1 | 12/2018 | Hoisington | |
| 2020/0088097 A1 * | 3/2020 | Bouldin | B64D 33/02 |
| 2020/0385135 A1 * | 12/2020 | Cochran | F02C 7/04 |
| 2021/0394917 A1 * | 12/2021 | Klovdahl | F02C 7/04 |
| 2022/0099023 A1 | 3/2022 | Pascal | |

\* cited by examiner

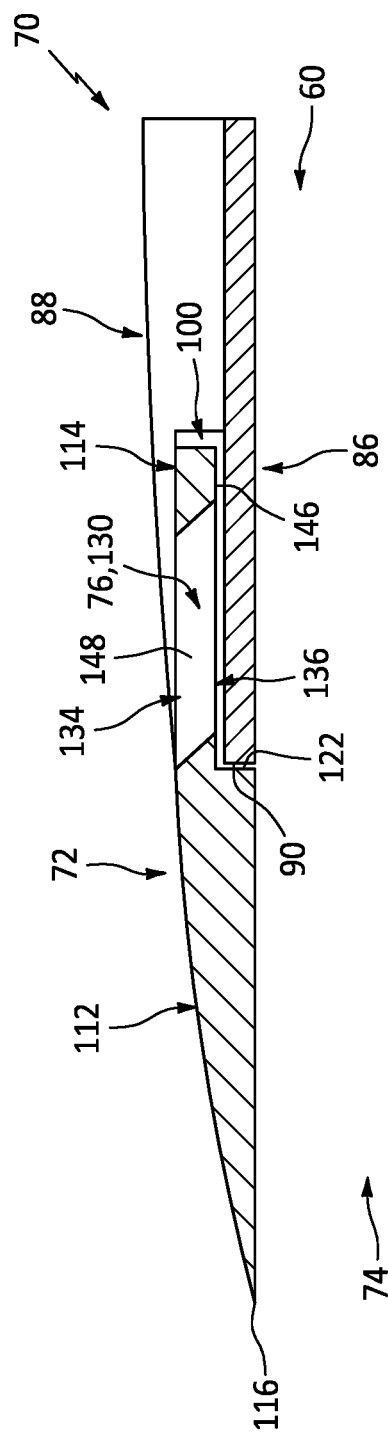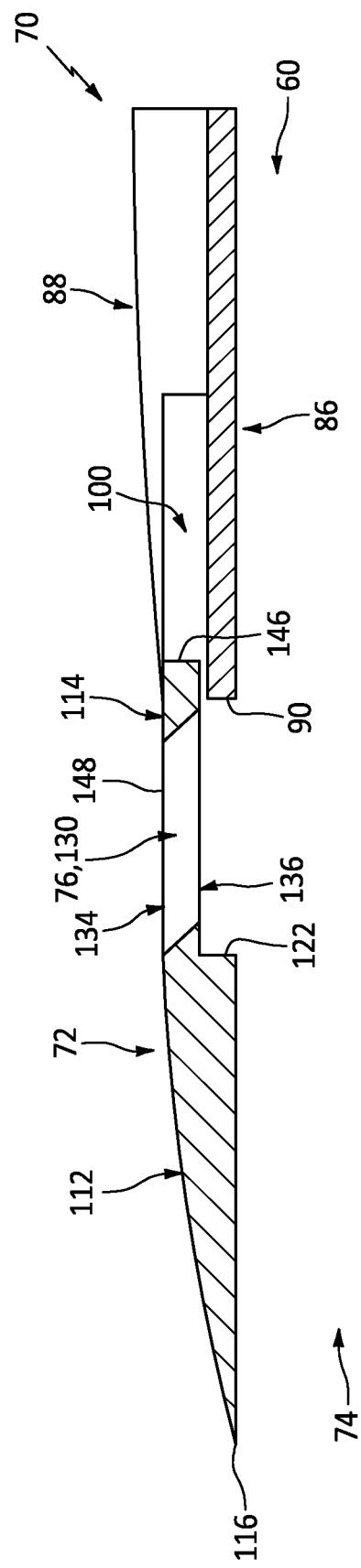
FIG. 8
FIG. 9

AIRCRAFT PROPULSION SYSTEM WITH VARIABLE AREA INLET

BACKGROUND

1. Technical Field

This disclosure relates generally to an aircraft propulsion system and, more particularly, to an inlet for the aircraft propulsion system with a variable airflow inlet area.

2. Background Information

An aircraft propulsion system may include an inlet structure and a gas turbine engine. The inlet structure directs air into the gas turbine engine. Some known inlet structures include a variable airflow inlet area, also known as an auxiliary inlet, for tailoring a mass flow of the air entering the gas turbine engine. While these known inlet structures have various advantages, there is still room in the art for improvement. There is a need in the art therefore for an improved inlet assembly with a variable airflow inlet area.

SUMMARY OF THE DISCLOSURE

According to an aspect of the present disclosure, an assembly is provided for an aircraft propulsion system. This assembly includes a variable area inlet. The variable area inlet includes a moveable structure configured to move axially along an axial centerline between a first position and a second position. The variable area inlet is configured to open an airflow inlet passage into the aircraft propulsion system when the movable structure is in the first position. The variable area inlet is configured to close the airflow inlet passage when the movable structure is in the second position. The airflow inlet passage includes an inlet. The inlet extends axially along the axial centerline from a first end to a second end. A distance from the first end to the second end changes as the inlet extends laterally between a first side and a second side.

According to another aspect of the present disclosure, another assembly is provided for an aircraft propulsion system. This assembly includes a variable area inlet. The variable area inlet includes a moveable structure configured to move axially along an axial centerline between a first position and a second position. The variable area inlet is configured to open an airflow inlet passage into the aircraft propulsion system when the moveable structure is in the first position. The variable area inlet is configured to close the airflow inlet passage when the moveable structure is in the second position. The airflow inlet passage includes an inlet. At least a portion of the inlet axially tapers as the inlet extends laterally between a first side of the inlet and a second side of the inlet.

According to still another aspect of the present disclosure, another assembly is provided for an aircraft propulsion system. This assembly includes a variable area inlet. The variable area inlet includes a fixed structure, a moveable structure, an inner airflow inlet passage, an outer airflow inlet passage and an inlet duct. The variable area inlet is configured to regulate airflow through the outer airflow inlet passage by translating the moveable structure axially along a centerline between a first position and a second position. The moveable structure includes an inlet lip structure. The inner airflow inlet passage is at a forward end of the moveable structure and is circumscribed by the inlet lip structure when the moveable structure is at the first position and the second position. The outer airflow inlet passage is disposed axially between the inlet lip structure and the fixed structure. The outer airflow inlet passage includes an inlet that extends axially along the centerline between a first end of the inlet and a second end of the inlet. The second end of the inlet has a non-straight geometry. The inlet duct is configured to receive airflow from the inner airflow inlet passage and the outer airflow inlet passage when the moveable structure is at the first position.

The portion of the inlet may be located laterally intermediate between the first side of the inlet and the second side of the inlet.

An axial distance from a first end of the inlet to a second end of the inlet may change as the inlet extends laterally from the first side of the inlet to the second side of the inlet.

The distance may have a first value at the first side. The distance may have a second value at the second side that may be different than the first value.

The distance may have a first value at the first side. The distance may have a second value at an intermediate position that may be different than the first value. The intermediate position may be laterally between the first side and the second side.

The distance may have a first value at the first side. The distance may have a second value at the second side that may be equal to the first value. The distance may have a third value at an intermediate position that may be different than the first value. The intermediate position may be laterally between the first side and the second side.

At least a portion of the second end may have a V-shaped geometry when viewed in a plane parallel with the centerline.

At least a portion of the second end may have a curved geometry when viewed in a plane parallel with the centerline.

At least a portion of the second end may be angularly offset from and/or may laterally overlap at least a portion of the first end when viewed in a plane parallel with the centerline.

An entirety of the first end may have a straight geometry. At least a portion (or an entirety) of the second end may have a non-straight geometry.

At least a portion (or an entirety) of the second end may have an axially undulating geometry.

The first position may be a forward position. The second position may be an aft position. The first end may be a forward end of the inlet. The second end may be an aft end of the inlet.

The moveable structure may include an inlet lip structure and a support structure. The first end of the inlet may be formed by the inlet lip structure. The second end of the inlet may be formed by the support structure.

The first side of the inlet and the second side of the inlet may be formed by the support structure.

The variable area inlet may also include a fixed structure. The support structure may be received within a receptacle of the fixed structure when the moveable structure is in the second position.

The assembly may also include an inlet duct. The airflow inlet passage may be configured as or otherwise include an outer airflow inlet passage. The variable area inlet may also include an inner airflow inlet passage at a forward end of the moveable structure. The inlet duct may be fluidly coupled with the inner airflow inlet passage when the moveable structure is in the second position. The inlet duct may be fluidly coupled with the inner airflow inlet passage and the outer airflow inlet passage when the moveable structure is in the first position.

The inlet duct may be configured to direct air received from the inner airflow inlet passage and the outer airflow inlet passage into a core flowpath and/or a bypass flowpath of the aircraft propulsion system when the moveable structure is in the first position.

The airflow inlet passage may be one of a plurality of airflow inlet passages into the aircraft propulsion system. The airflow inlet passages may be distributed circumferentially about the axial centerline.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 8 is a partial side sectional illustration of the variable area inlet with the moveable structure in an aft position.

FIG. 9 is a partial side sectional illustration of the variable area inlet with the moveable structure in a forward position.

DETAILED DESCRIPTION

Figure 1:
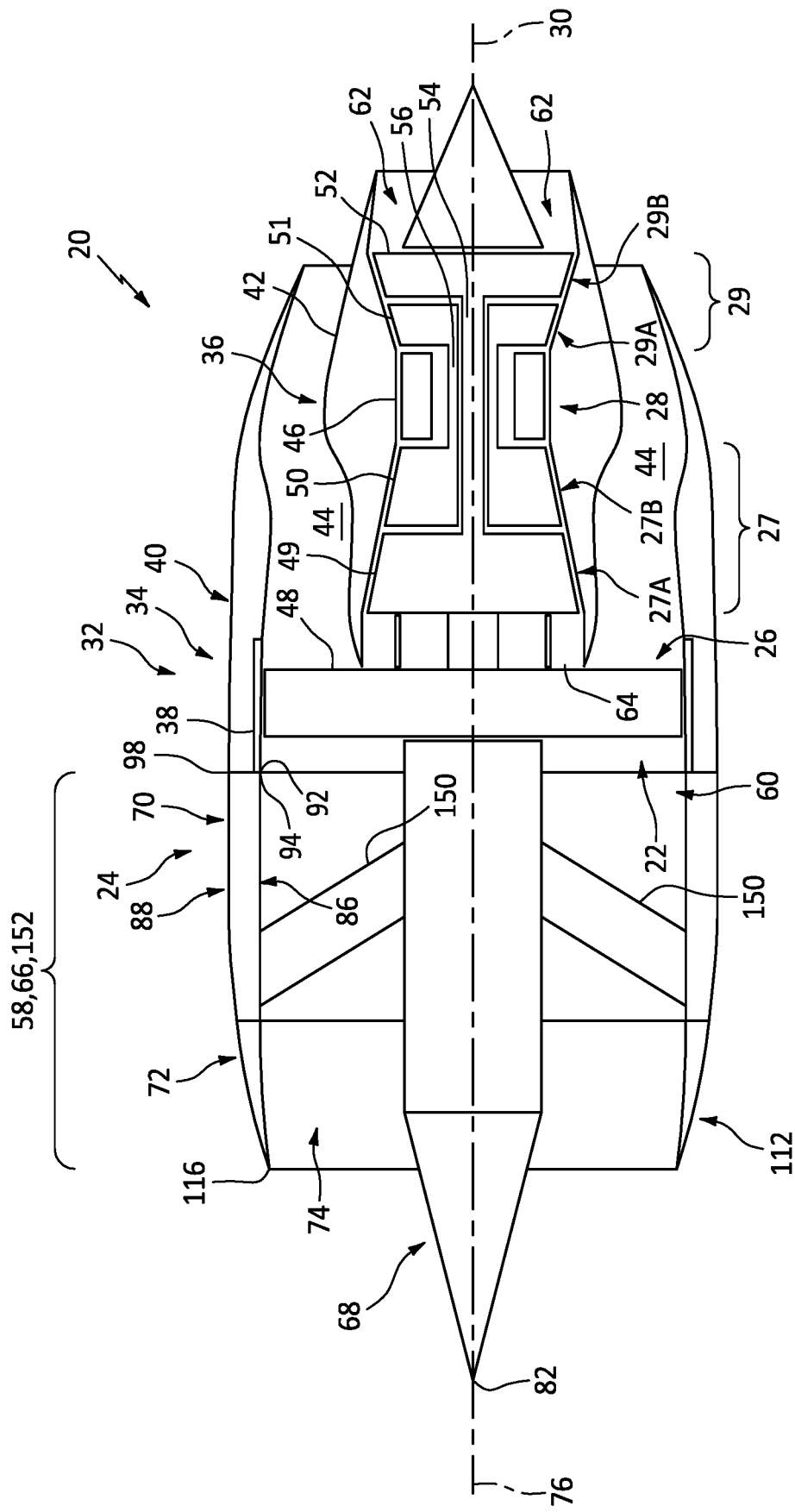
FIG. 1 is a schematic side sectional illustration of an aircraft propulsion system with a variable area inlet in a closed position.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This aircraft propulsion system housing 32 includes an outer housing structure 34 and an inner housing structure 36.

The outer housing structure 34 includes an outer case 38 (e.g., a fan case) and an outer structure 40 of the nacelle 24; e.g., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; e.g., an inner nacelle structure, which may also be referred to as an inner fixed structure (IFS). More particularly, the outer nacelle structure 40 axially overlaps and extends circumferentially about (e.g., completely around) the inner nacelle structure 42. The outer nacelle structure 40 and the inner nacelle structure 42 thereby at least partially or completely form an annular bypass flowpath 44 within the aircraft propulsion system 20.

The inner housing structure 36 includes an inner case 46 (e.g., a core case) and the inner nacelle structure 42. The inner case 46 houses one or more of the engine sections 27A-29B, which engine sections 27A-29B may be collectively referred to as an engine core. The inner nacelle structure 42 houses and provides an aerodynamic cover for the inner case 46.

Each of the engine sections 26, 27A, 27B, 29A and 29B includes a bladed rotor 48-52. The fan rotor 48 and the LPC rotor 49 are connected to and driven by the LPT rotor 52 through a low speed shaft 54. The HPC rotor 50 is connected to and driven by the HPT rotor 51 through a high speed shaft 56. The shafts 54 and 56 are rotatably supported by a plurality of bearings (not shown). Each of these bearings is connected to the aircraft propulsion system housing 32 (e.g., the inner case 46) by at least one stationary structure such as, for example, an annular support strut.

During operation, air enters the aircraft propulsion system 20 through an aircraft propulsion system inlet structure 58. This air is directed through an inlet duct 60 and into an annular core flowpath 62 and the bypass flowpath 44. The core flowpath 62 extends axially along the axial centerline 30 within the aircraft propulsion system 20, through the engine sections 27A-29B, to a core nozzle outlet, where the core flowpath 62 is radially within the inner case 46. The bypass flowpath 44 extends axially along the axial centerline 30 within the aircraft propulsion system 20 to a bypass nozzle outlet, where the bypass flowpath 44 is radially between the outer nacelle structure 40 and the inner nacelle structure 42. The air within the core flowpath 62 may be referred to as "core air". The air within the bypass flowpath 44 may be referred to as "bypass air".

The core air is compressed by the compressor rotors 49 and 50 and directed into a combustion chamber of a combustor in the combustor section 28. Fuel is injected into the combustion chamber and mixed with the compressed core air to provide a fuel-air mixture. This fuel-air mixture is ignited and combustion products thereof flow through and sequentially cause the turbine rotors 51 and 52 to rotate. The rotation of the turbine rotors 51 and 52 respectively drive rotation of the compressor rotors 50 and 49 and, thus, compression of the air received from a core airflow inlet 64. The rotation of the LPT rotor 52 also drives rotation of the fan rotor 48, which propels bypass air through and out of the bypass flowpath 44. The propulsion of the bypass air may account for a majority of thrust generated by the gas turbine engine 22. The aircraft propulsion system 20 of the present disclosure, however, is not limited to the exemplary gas turbine engine configuration described above.

Optimal mass flow requirements of the air entering the aircraft propulsion system 20 through the aircraft propulsion system inlet structure 58 may change depending upon one or more parameters. These parameters may include, but are not limited to, modes of operation, aircraft maneuvers and operating conditions. For example, where the aircraft flies at supersonic speeds, a first mass flow of the air may be directed through the aircraft propulsion system inlet structure 58 into the aircraft propulsion system 20. When the aircraft flies at subsonic speeds, a second mass flow of the air may be directed through the aircraft propulsion system inlet structure 58 into the aircraft propulsion system 20, where the second mass flow may be different (e.g., greater) than the first mass flow.

Figure 2:
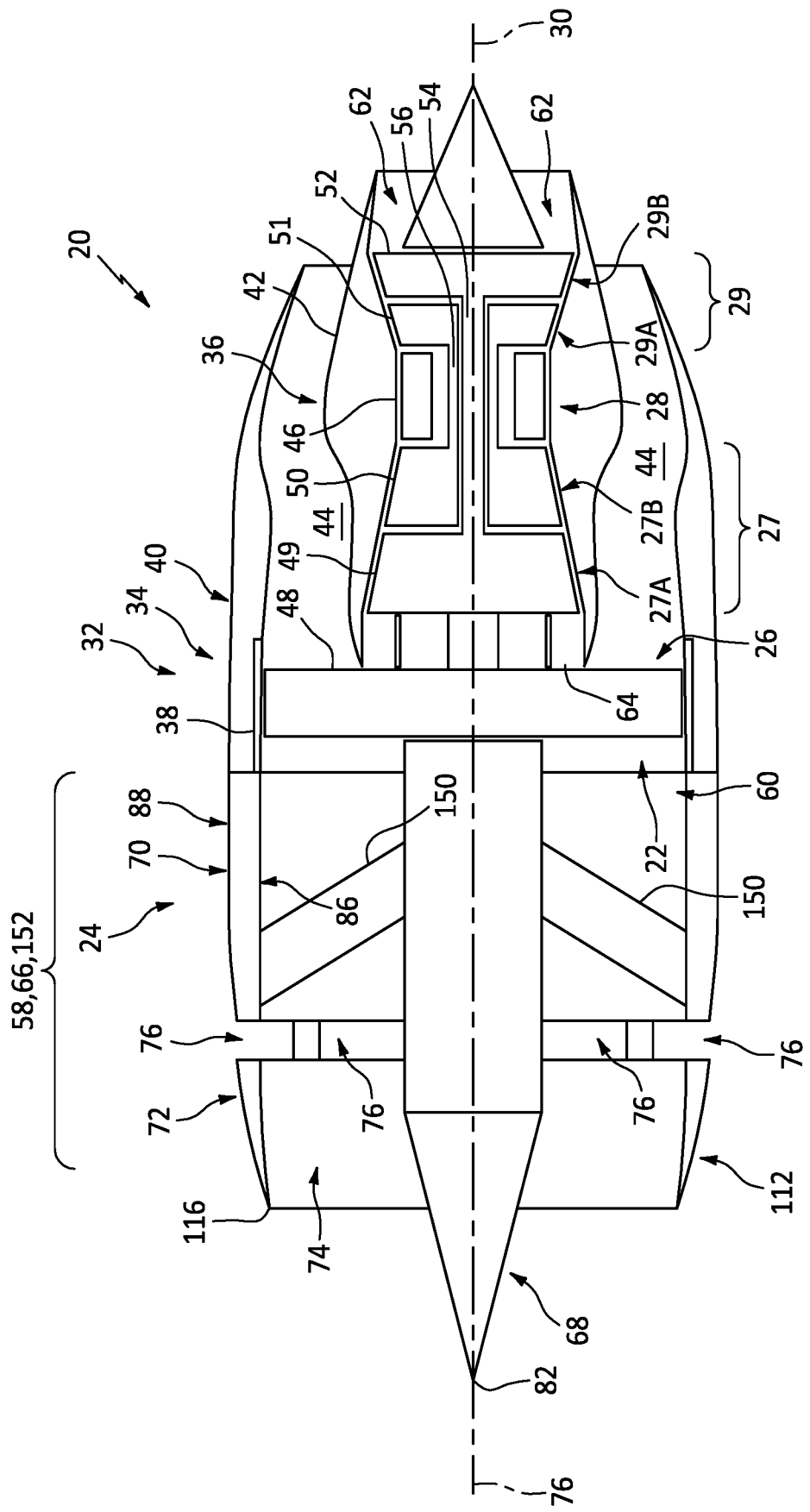
FIG. 2 is a schematic side sectional illustration of the aircraft propulsion system with the variable area inlet in an open position.

To accommodate the changing mass flow requirements for the aircraft propulsion system 20, the aircraft propulsion system inlet structure 58 is configured as a variable area inlet 66. Referring to FIGS. 1 and 2, this variable area inlet 66 includes a center body 68, an aft fixed structure 70 and a forward moveable (e.g., a translating) structure 72. These inlet components 68, 70 and 72 are configured to provide the variable area inlet 66 with an annular inner airflow inlet passage 74 and one or more outer airflow inlet passages 76, also known as auxiliary inlets (see FIG. 2). Briefly, the inner airflow inlet passage 74 of FIGS. 1 and 2 is configured as a primary airflow inlet passage, which inlet passage may be a variable area inlet passage or a fixed area airflow inlet passage. The outer airflow inlet passages 76 of FIG. 2 are configured as secondary airflow inlet passages, which inlet passages are variable area airflow inlet passages.

Figure 3:
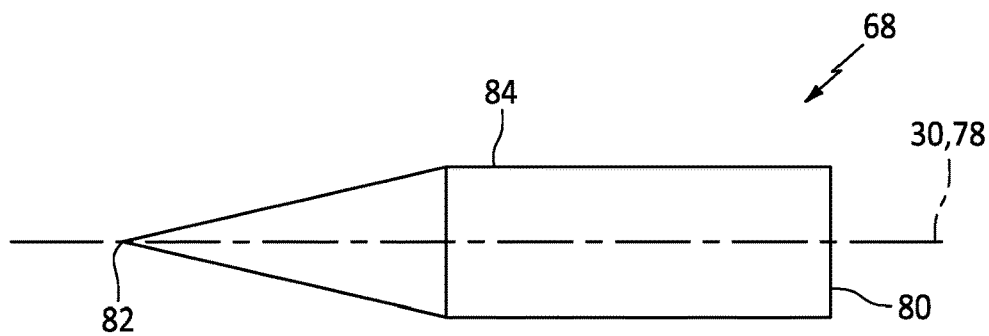
FIG. 3 is a side illustration of a center body for the variable area inlet.

Referring to FIG. 3, the center body 68 is configured to form an inlet cone and/or an inlet spike for the aircraft propulsion system 20. The center body 68 extends axially along an axial centerline 78 (e.g., an axis) of the variable area inlet 66 (see FIGS. 1 and 2) from a downstream, aft end 80 of the center body 68 to an upstream, forward end 82 (e.g., a tip, a point) of the center body 68, which centerline 78 may be coaxial with the axial centerline 30. The center body 68 extends radially outward to an outer side 84 of the center body 68. This center body outer side 84 extends circumferentially about (e.g., completely around) the axial centerline 30, 78. At least a forward portion of the center body outer side 84 radially tapers inward as the center body 68 extends axially to its forward end 82; e.g., a tip/a leading end point of the center body 68.

Figure 4:
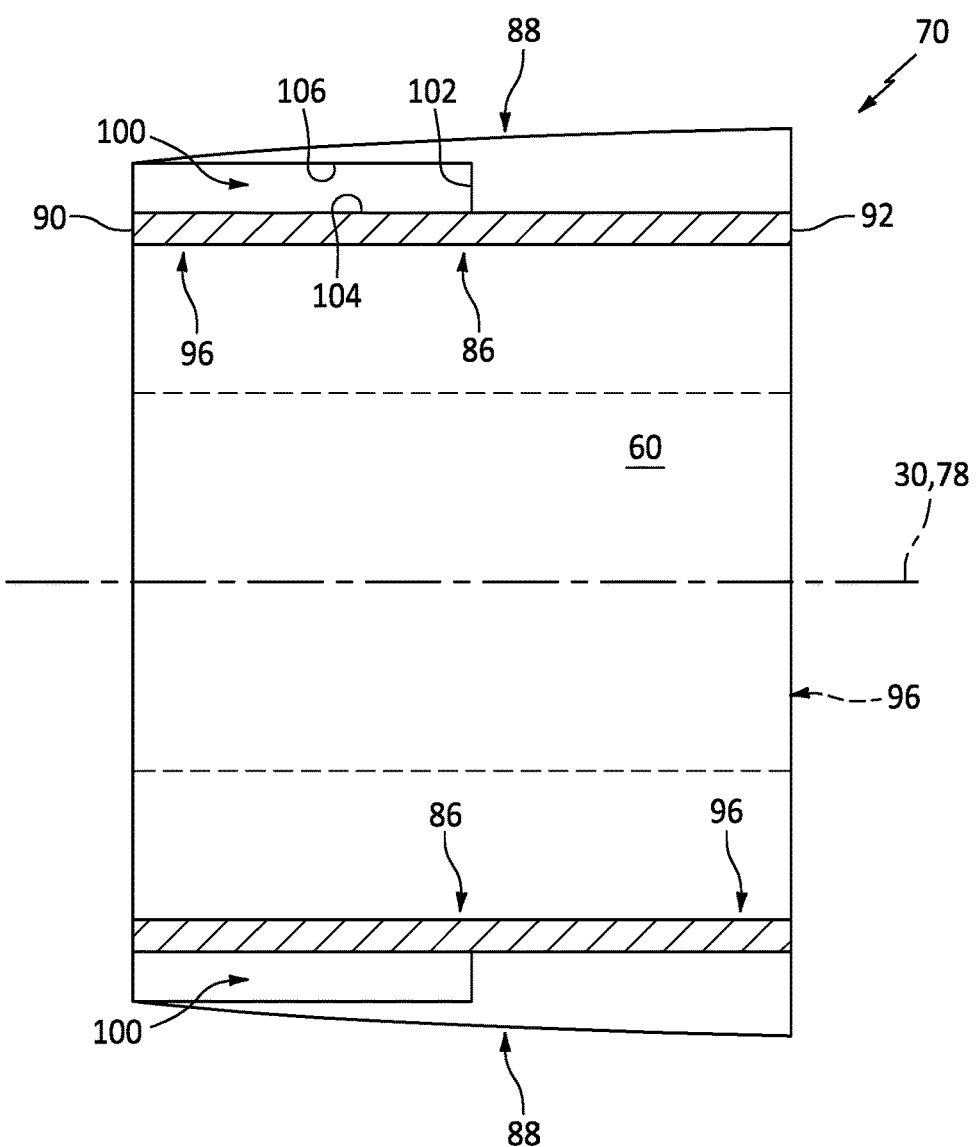
FIG. 4 is a side sectional illustration of a fixed structure for the variable area inlet.

Referring to FIG. 4, the fixed structure 70 is configured to form at least a forward portion of the inlet duct 60 (see also FIGS. 1 and 2). Briefly, referring to FIGS. 1 and 2, an aft portion of the inlet duct 60 may be formed by the outer case 38. However, in other embodiments, the fixed structure 70 may form an entirety of the inlet duct 60 where, for example, the gas turbine engine 22 is configured as a turbojet engine without the bypass flowpath 44. Referring again to FIG. 4, the fixed structure 70 includes a tubular inner barrel 86 and a tubular outer barrel 88.

The inner barrel 86 extends circumferentially about (e.g., completely around) the axial centerline 30, 78. The inner barrel 86 extends axially along the axial centerline 30, 78 between and to (or about) an upstream, forward end 90 of the fixed structure 70 and a downstream, aft end 92 of the fixed structure 70. At the fixed structure aft end 92 of FIG. 1, the inner barrel 86 is connected to an upstream, forward end 94 of the outer case 38. The inner barrel 86 may be configured to attenuate noise generated during aircraft propulsion system operation and, more particularly for example, noise generated by rotation of the fan rotor 48. The inner barrel 86 of FIG. 4, for example, may include at least one tubular noise attenuating acoustic panel 96 or a circumferential array of arcuate noise attenuating acoustic panels 96 (see dashed lines) arranged around the axial centerline 30, 78. The present disclosure, however, is not limited to such an acoustic inner barrel configuration.

The outer barrel 88 extends circumferentially about (e.g., completely around) the axial centerline 30, 78. The outer barrel 88 extends axially along the axial centerline 30, 78 between and to (or about) the fixed structure forward end 90 and the fixed structure aft end 92. At the fixed structure aft end 92 of FIG. 1, the outer barrel 88 is disposed next to respective (e.g., upstream, forward) ends 98 of a pair of fan cowls of the outer nacelle structure 40.

The fixed structure 70 of FIG. 4 is configured with receptacle 100 (e.g., an annular cavity) for the moveable structure 72; see FIG. 8. The receptacle 100 is disposed at (e.g., on, adjacent or proximate) the fixed structure forward end 90. The receptacle 100 of FIG. 4, for example, projects axially along the axial centerline 30, 78 into the fixed structure 70 from the fixed structure forward end 90 to an interior receptacle end 102. The receptacle 100 extends radially within the fixed structure 70 between and to a receptacle inner side 104 and a receptacle outer side 106. The receptacle 100 extends circumferentially within the fixed structure 70 circumferentially about (e.g., completely around) the axial centerline 30, 78.

Figure 5:
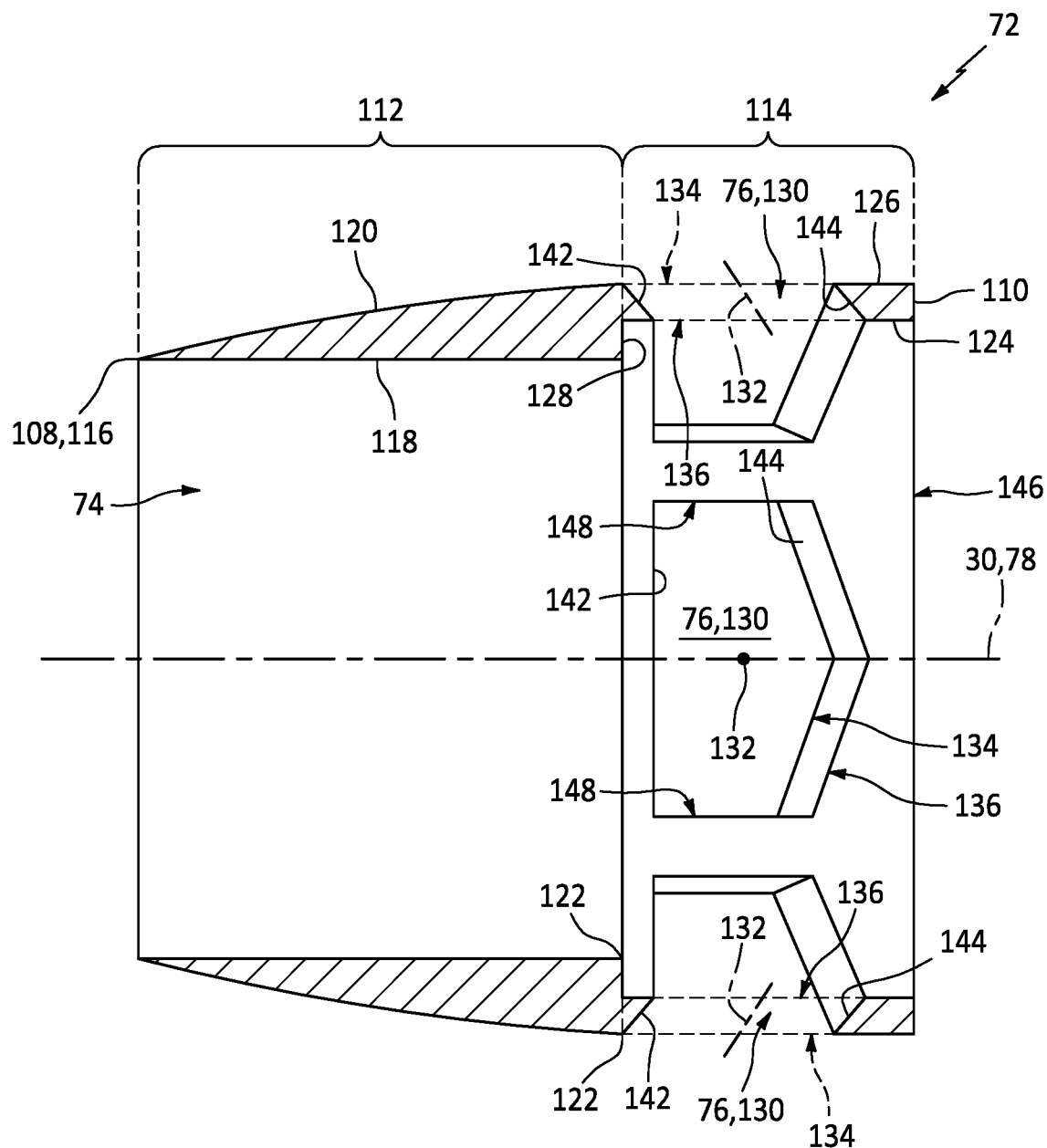
FIG. 5 is a side sectional illustration of a moveable structure for the variable area inlet.

Referring to FIG. 5, the moveable structure 72 extends axially along the axial centerline 30, 78 between and to an upstream, forward end 108 of the moveable structure 72 and a downstream, aft end 110 of the moveable structure 72. The moveable structure 72 of FIG. 5 includes a tubular inlet lip structure 112 and a support structure 114; e.g., a sleeve, a frame, etc.

The inlet lip structure 112 is disposed at the moveable structure forward end 108. The inlet lip structure 112 is configured to form a leading edge 116 of the nacelle 24 (see FIG. 1) as well as an outer peripheral boundary of the inner airflow inlet passage 74. The inlet lip structure 112 of FIG. 5 has a cupped (e.g., a generally V-shafted or U-shaped) side sectional geometry when viewed, for example, in a plane parallel with and/or coincident with the axial centerline 30, 78. The inlet lip structure 112 and its cupped side sectional geometry extend circumferentially about (e.g., completely around) the axial centerline 30, 78. The inlet lip structure 112 of FIG. 5, for example, includes axially overlapping inner and outer lip portions 118 and 120. The inner lip portion 118 is connected to and may be integral with the outer lip portion 120 at and along the nacelle leading edge 116. An aft, downstream end of the inner lip portion 118 is located at a downstream, aft end 122 of the inlet lip structure 112. A downstream, aft end of the outer lip portion 120 is also located at the inlet lip structure aft end 122.

The support structure 114 is disposed at the moveable structure aft end 110. The support structure 114 is connected to the inlet lip structure 112. The support structure 114 projects axially along the axial centerline 30, 78 out from the aft end 122 of the inlet lip structure 112 to the moveable structure aft end 110. The support structure 114 extends radially between and to an inner side 124 of the support structure 114 and an outer side 126 of the support structure 114. The support structure inner side 124 of FIG. 5 is radially recessed outward from the inner lip portion 118 at the inlet lip structure aft end 122, which provides a (e.g., annular) shoulder 128 between the inner lip portion 118 and the support structure inner side 124. The support structure outer side 126 may be contiguous with the outer lip portion 120. The support structure 114 extends circumferentially about (e.g., completely around) the axial centerline 30, 78.

The moveable structure 72 of FIG. 5 is configured with one or more apertures 130; e.g., ports, windows, etc. These apertures 130 are arranged circumferentially about the axial centerline 30, 78 in an annular array. Each of the apertures 130 is configured to at least partially or completely form a respective one of the outer airflow inlet passages 76. For ease of description, the apertures 130 are described below with reference to the outer airflow inlet passages 76.

Figure 6:
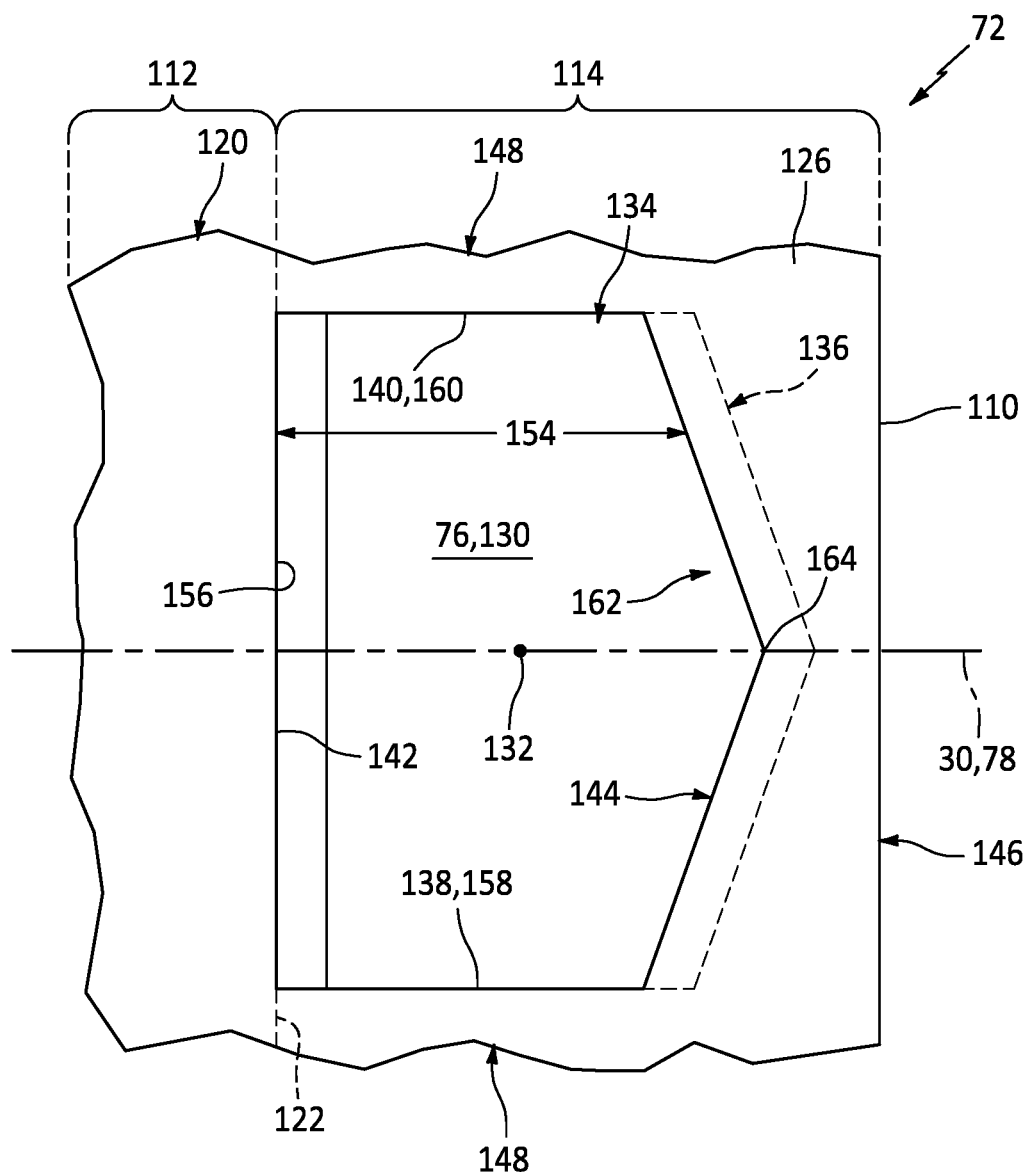
FIG. 6 is an illustration of a portion of the moveably structure about an inlet to an airflow inlet passage.

Each of the outer airflow inlet passages 76 of FIG. 5 extends longitudinally along a longitudinal centerline 132 of the respective outer airflow inlet passage 76 (e.g., radially) through the moveable structure 72 and its support structure 114 from an inlet 134 of the respective outer airflow inlet passage 76 to an outlet 136 of the respective outer airflow inlet passage 76. The passage inlet 134 forms an inlet orifice to the respective outer airflow inlet passage 76, and is disposed at the support structure outer side 126. The passage outlet 136 may form an outlet orifice from the respective outer airflow inlet passage 76, and is disposed at the support structure inner side 124. Referring to FIG. 6, each of the outer airflow inlet passages 76 extends laterally (e.g., circumferentially or tangentially) between and to opposing lateral sides 138 and 140 of the respective outer airflow inlet passage 76. Each of the outer airflow inlet passages 76 extends transversely (e.g., axially along the axial centerline 30, 78) between and to an upstream, forward end 142 of the respective outer airflow inlet passage 76 and a downstream, aft end 144 of the respective outer airflow inlet passage 76.

Figure 7:
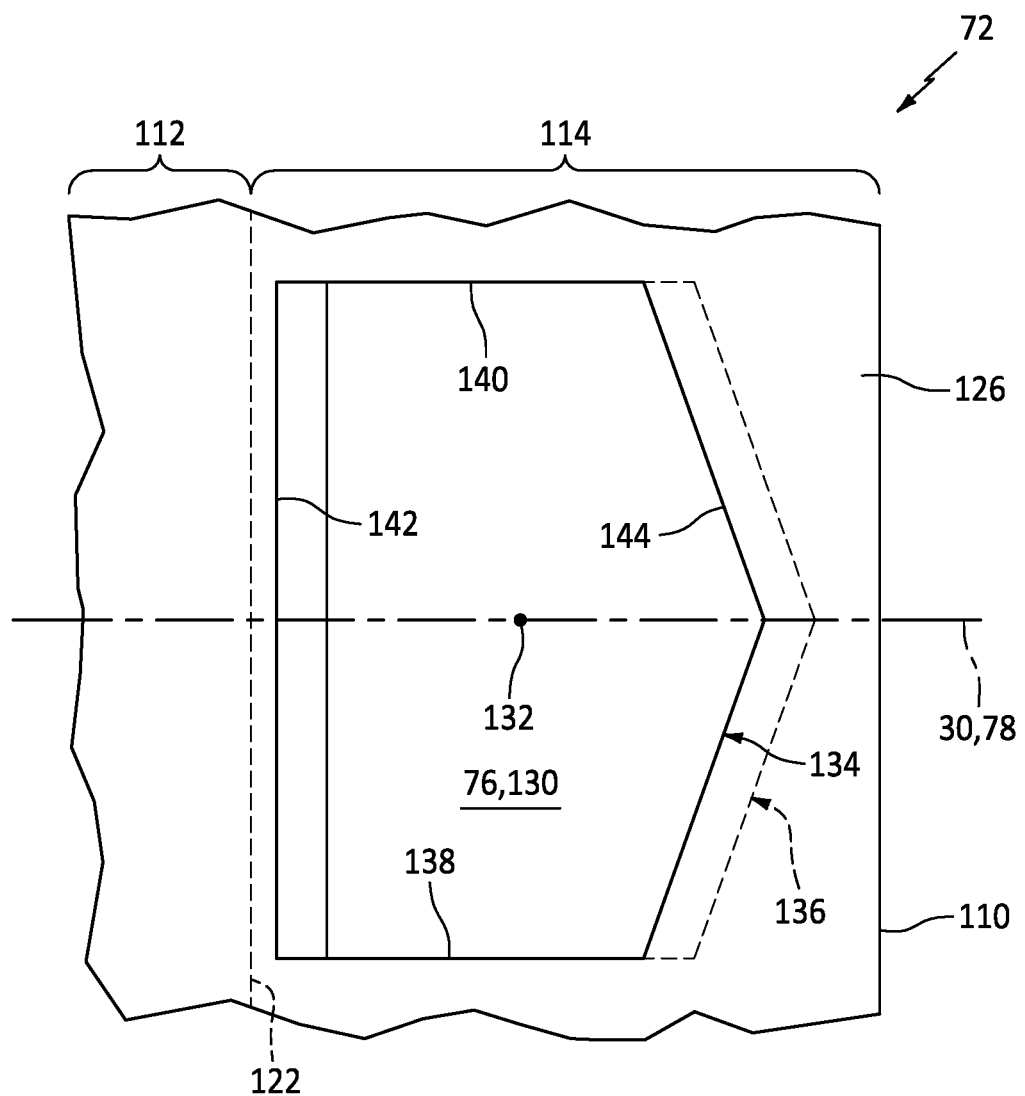
FIG. 7 is an illustration of a portion of the moveably structure about an inlet to another airflow inlet passage.

The passage first side 138, the passage second side 140 and the passage aft end 144 of FIG. 6 are formed (e.g., completely) by the support structure 114. The passage forward end 142 of FIG. 6 is at least partially (or completely) formed by the inlet lip structure 112 at its aft end 122. The present disclosure, however, is not limited to such an exemplary outer airflow inlet passage arrangement. For example, referring to FIG. 7, the passage forward end 142 may alternatively be formed by the support structure 114. One or more or all of the outer airflow inlet passages 76, for example, may be axially displaced from the inlet lip structure aft end 122 by an axial distance.

The support structure 114 of FIG. 5 includes a (e.g., annular or tubular) support structure base 146 and one or more pylons 148; e.g., struts, beams, etc. The support structure base 146 is arranged at the moveable structure aft end 110. The pylons 148 are arranged circumferentially about the axial centerline 30, 78 in an array. Each of the pylons 148 is located circumferentially between and separates a circumferentially neighboring (e.g., adjacent) pair of the outer airflow inlet passages 76. Each of the pylons 148 of FIG. 5 extends axially along the axial centerline 30, 78 between and is connected to the inlet lip structure 112 and the support structure base 146.

Referring to FIGS. 8 and 9, the moveable structure 72 is mated with the fixed structure 70. The support structure 114 of FIGS. 8 and 9, for example, is arranged within the receptacle 100. The moveable structure 72 is further moveably coupled with the fixed structure 70. The support structure base 146, for example, may be slidably connected to the fixed structure 70 by one or more slider and/or track assemblies and/or other devices. With this configuration, the moveable structure 72 is configured to move (e.g., translate) axially along the axial centerline 30, 78 between an aft (e.g., retracted, fully closed) position (see FIG. 8) and a forward (e.g., extended, fully open) position (see FIG. 9).

At the aft position of FIG. 8, the inlet lip structure aft end 122 is abutted axially against the fixed structure forward end 90. The inlet lip structure 112 may axially (e.g., sealingly) engage the fixed structure 70 through, for example, a seal element such as a gasket. With this arrangement, the support structure 114 and its elements 146 and 148 are (e.g., completely) stowed (e.g., received) within the receptacle 100. Each of the outer airflow inlet passages 76 and its passage inlet 134 are covered and thereby closed by a respective portion of the fixed structure 70 and its outer barrel 88.

At the forward position of FIG. 9, the inlet lip structure aft end 122 is axially displaced from the fixed structure forward end 90 by an axial distance along the axial centerline 30, 78. With this arrangement, the pylons 148 and at least a forward end portion of the support structure base 146 project axially out from the receptacle 100 and the fixed structure forward end 90. Each of the outer airflow inlet passages 76 and its passage inlet 134 are uncovered and thereby opened.

Referring to FIGS. 1 and 2, the center body 68 is fixedly connected to the fixed structure 70. The center body 68 of FIGS. 8 and 9, for example, is structurally tied to the fixed structure 70 by one or more struts 150.

With the foregoing configuration of FIGS. 1 and 2, the variable area inlet elements 68, 70 and 72 are configured as a valve 152. This valve 152 is configured to regulate the flow of air through at least the outer airflow inlet passages 76 to the inlet duct 60. For example, in the aft position of FIG. 1, the valve 152 is configured to (e.g., fully, completely) close the outer airflow inlet passages 76 (see FIG. 2). The valve 152 may thereby fluidly decouple the outer airflow inlet passages 76 from the inlet duct 60. However, in the forward position of FIG. 2, the valve 152 is configured to (e.g., fully, completely) open the outer airflow inlet passages 76. The valve 152 may thereby fluidly couple the outer airflow inlet passages 76 with the inlet duct 60. While the moveable structure 72 is described above as moving (e.g., axially translating) between its aft position (see FIG. 1) and its forward position (see FIG. 2), it is contemplated the moveable structure 72 may also move to one or more intermediate positions axially therebetween in order to variably modulate/regulate the flow of air through the outer airflow inlet passages 76 to the inlet duct 60.

Figure 10A:
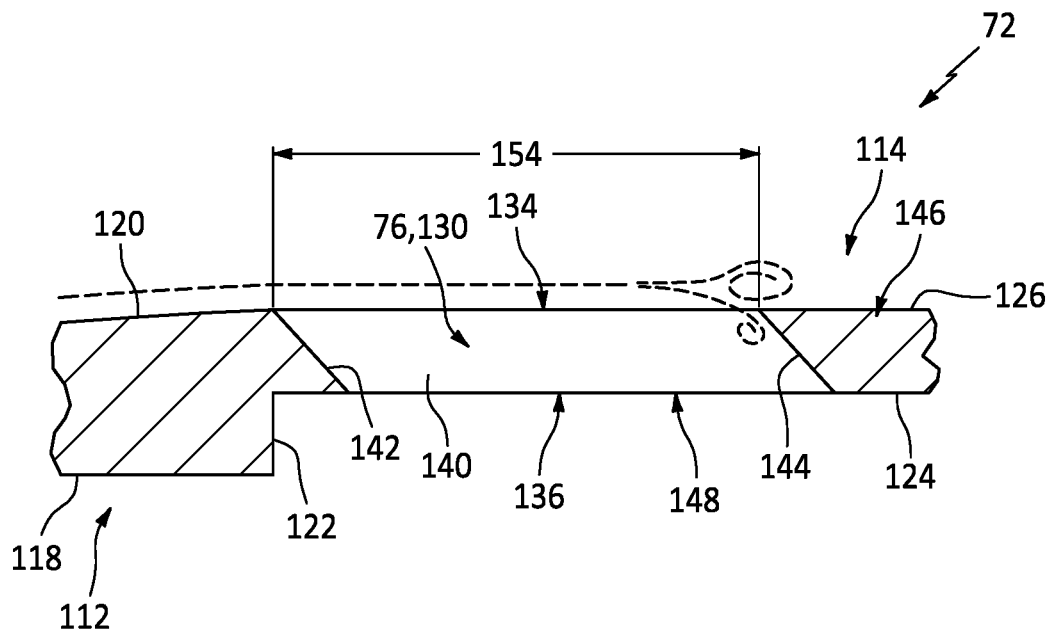
FIGS. 10A and 10B are partial side sectional illustrations of the moveable structure during propulsion system operation.
Figure 10B:
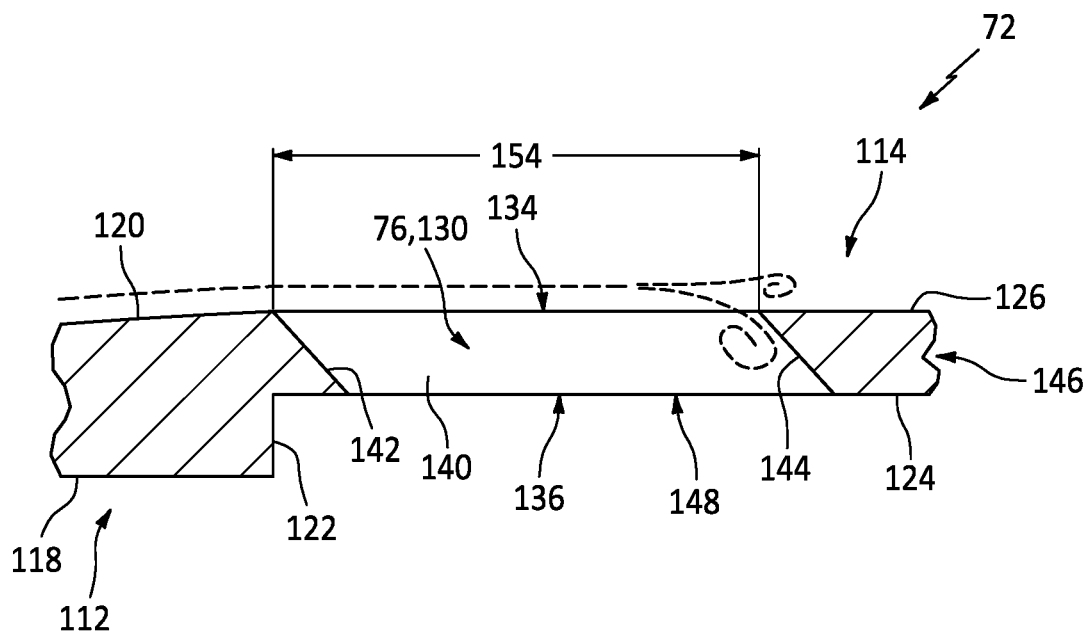
Figure 11:
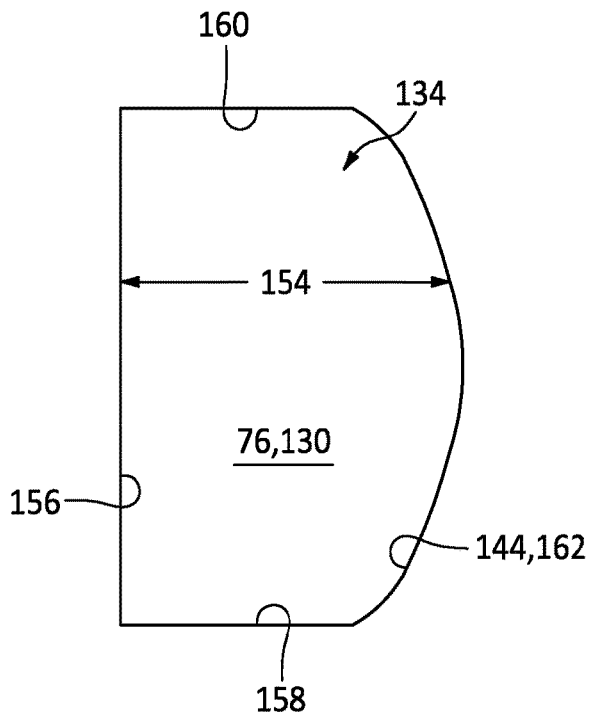
FIGS. 11-14 are illustrations of the inlet to the airflow inlet passage configured with various other geometries.

Referring to FIGS. 10A and 10B, under certain conditions, air may flow across a respective passage inlet 134 and interact with the passage aft end 144. Some of the air, for example, may impinge against the passage aft end 144 at the passage inlet 134. The passage aft end 144 may redirect this air downward into the respective outer airflow inlet passage 76 towards the inlet duct 60. Some of the air may also flow past/skip by an edge between the passage aft end 144 and the support structure outer side 126. These and/or other fluid dynamic interactions between the air and the variable area inlet elements (e.g., 112, 114, 146 and/or 148) may generate noise; e.g., whistling. Referring to FIG. 6, such noise generation may be related to an axial distance 154 measured between the passage forward end 142 and the passage aft end 144 at the passage inlet 134. Therefore, to mitigate/reduce generation of noise (e.g., whistling) when the moveable structure 72 is deployed and the outer airflow passages are opened, the axial distance 154 for one or more or all of the outer airflow inlet passages 76 is varied laterally across the passage inlet 134 between the opposing sides 138 and 140. The outer airflow inlet passages 76, for example, are configured with (e.g., tuned to have) different resonant frequencies laterally cross the passage inlet 134.

Each outer airflow inlet passage 76 and its passage inlet 134 of FIG. 6 has a cross-sectional geometry when viewed, for example, in a reference plane. This reference plane may be parallel and radially displaced from the axial centerline 30, 78. The reference plane may also or alternatively be perpendicular to and coincident with the longitudinal centerline 132 of the respective outer airflow inlet passage 76 and its passage inlet 134. The cross-sectional geometry may have a polygonal shape or other shape; e.g., see FIGS. 6 and 11-14.

The cross-sectional geometry of FIG. 6 includes a forward end 156, opposing sides 158 and 160 and an aft end 162. The forward end 156 is formed by the passage forward end 142 at the passage inlet 134. The first side 158 is formed by the passage first side 138 at the passage inlet 134. The second side 160 is formed by the passage second side 140 at the passage inlet 134. The aft end 162 is formed by the passage aft end 144 at the passage inlet 134.

The forward end 156 of FIG. 6 has a straight geometry as the forward end 156 extends laterally between and to the opposing sides 158 and 160. This forward end 156 may be arranged perpendicular to the axial centerline 30, 78. Each of the opposing sides 158, 160 of FIG. 6 has a straight geometry as the respective side 158, 160 extends transversely (e.g., axially) between and to the forward end 156 and the aft end 162. Each of these sides 158 and 160 may be arranged parallel with the axial centerline 30, 78. The aft end 162 of FIG. 6 has a non-straight geometry; e.g., a V-shaped geometry. The axial distance 154, for example, may continuously (or incrementally) increase as the respective passage inlet 134 extends laterally from the first side 158 to an intermediate (e.g., center) position 164. The axial distance 154 may then continuously (or incrementally) decrease as the respective passage inlet 134 extends laterally from the intermediate position 164 to the second side 160. Thus, a value of the axial distance 154 at the first side 158 may be equal to a value of the axial distance 154 at the second side 160. However, the value of the axial distance 154 at the first side 158 and/or the second side 160 may be different (e.g., less) than a value of the axial distance 154 at the intermediate position 164. A first portion (e.g., half) of the passage inlet 134 of FIG. 6, for example, axially tapers as the passage inlet 134 extends laterally from the intermediate position 164 (in a first lateral direction) to the first side 158. A second portion (e.g., half) of the passage inlet 134 of FIG. 6 axially tapers as the passage inlet 134 extends laterally from the intermediate position 164 (in a second lateral direction) to the second side 160.

Figure 12:
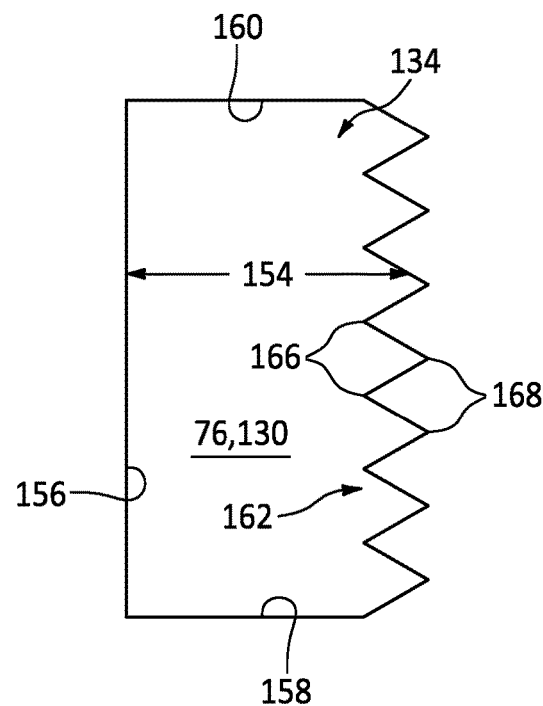
Figure 13:
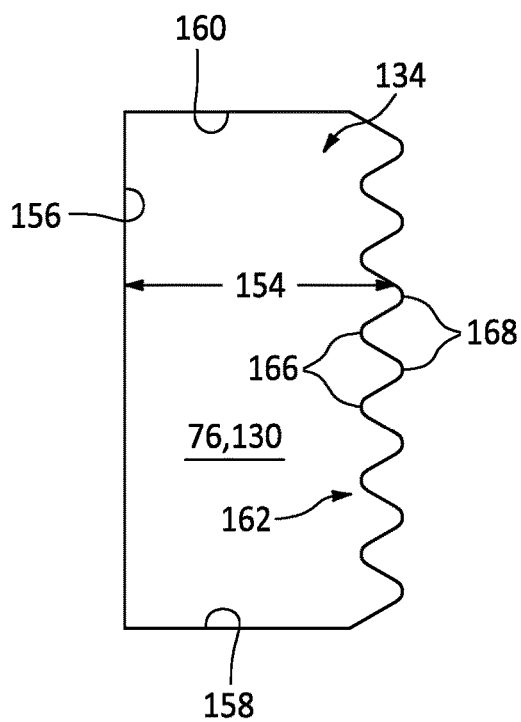

The aft end 162 may have various geometries other than the exemplary non-straight geometry described above. For example, referring to FIG. 11, the aft end 162 may have a curved geometry. The passage aft end 144 and, thus, the aft end 162, for example, may be configured with an arcuate (e.g., partially circular, partially oval, etc.) profile. Referring to FIGS. 12 and 13, the aft end 162 may alternatively have a tortuous (e.g., axially undulating) geometry. The aft ends 162 of FIGS. 12 and 13, for example, have wavy geometries with one or more peaks 166 and one or more valleys 168. The peaks 166 and/or the valleys 168 may have sharp transitions (e.g., tips, creases) as shown, for example, in FIG. 12. The peaks 166 and/or the valleys 168 may alternatively have eased (e.g., rounded) transitions as shown, for example, in FIG. 13. With each of the foregoing configurations, at least a portion/segment of the aft end 162 is angularly offset from and laterally overlaps a corresponding portion/segment of the forward end 156.

Figure 14:
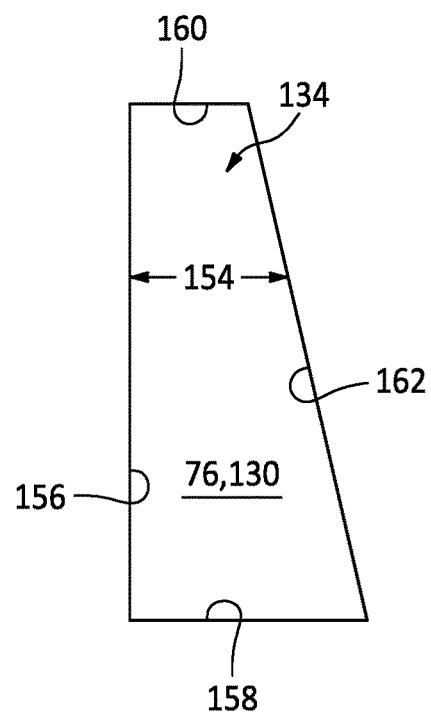

Referring to FIG. 14, the aft end 162 may alternatively have a straight geometry between the opposing sides 158 and 160, where the aft end 162 is non-parallel with/angularly offset from the forward end 156. The axial distance 154 of FIG. 14 may thereby continuously decrease as the respective passage inlet 134 extends from one of the opposing sides 158, 160 (e.g., the first side 158) to the other of the opposing sides 160, 158 (e.g., the second side 160). The value of the axial distance 154 at the first side 158 may thereby be different (e.g., greater) than the value of the axial distance 154 at the second side 160.

The axial distance 154 between the forward end 156 and the aft end 162 is (e.g., continuously or incrementally) varied in FIGS. 6 and 11-14 by varying a geometry and/or skewing an orientation of the aft end 162. It is contemplated, however, the axial distance 154 may also or alternatively be varied by varying a geometry and/or skewing an orientation of the forward end 156. The forward end 156, for example, may be configured with any of the geometries/orientations described above with respect to the aft end 162.

The aircraft propulsion system 20 and its variable area inlet 66 may be configured with various gas turbine engines other than the one described above. The gas turbine engine, for example, may be configured as a geared or a direct drive turbine engine. The gas turbine engine may be configured with a single spool, with two spools (e.g., see FIG. 1), or with more than two spools. The gas turbine engine may be configured as a turbofan engine, a turbojet engine or any other type of turbine engine. The present invention therefore is not limited to any particular types or configurations of gas turbine engines. The present disclosure is also not limited to applications where the aircraft is capable of traveling supersonic speeds.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
a variable area inlet comprising a moveable structure configured to move axially along an axial centerline between a first position and a second position;
the variable area inlet configured to open a first airflow inlet passage and a second airflow inlet passage into the aircraft propulsion system when the movable structure is in the first position, and the variable area inlet configured to close the first airflow inlet passage and the second airflow inlet passage when the movable structure is in the second position;
the first airflow inlet passage comprising a first inlet, the first inlet extending axially along the axial centerline from a first end of the first inlet to a second end of the first inlet, and a distance from the first end of the first inlet to the second end of the first inlet changing as the first inlet extends laterally between a first side of the first inlet and a second side of the first inlet;
the second airflow inlet passage comprising a second inlet, the second inlet extending axially along the axial centerline from a first end of the second inlet to a second end of the second inlet, and a distance from the first end of the second inlet to the second end of the second inlet changing as the second inlet extends laterally between a first side of the second inlet and a second side of the second inlet; and the moveable structure comprising a tubular inlet lip structure connected to an annular sleeve, the first inlet and the second inlet extending radially through the annular sleeve so that a portion of the annular sleeve laterally between and forming the second side of the first inlet and the first side of the second inlet defines an axial pylon.

2. The assembly of claim 1, wherein
the distance has a first value at the first side of the first inlet; and
the distance has a second value at the second side of the first inlet that is different than the first value.

3. The assembly of claim 1, wherein
the distance has a first value at the first side of the first inlet; and
the distance has a second value at an intermediate position that is different than the first value, and the intermediate position is laterally between the first side of the first inlet and the second side of the first inlet.

4. The assembly of claim 1, wherein
the distance has a first value at the first side of the first inlet;
the distance has a second value at the second side of the first inlet that is equal to the first value; and
the distance has a third value at an intermediate position that is different than the first value, and the intermediate position is laterally between the first side of the first inlet and the second side of the first inlet.

5. The assembly of claim 1, wherein at least a portion of the second end of the first inlet has a V-shaped geometry when viewed in a plane parallel with the centerline.

6. The assembly of claim 1, wherein at least a portion of the second end of the first inlet has a curved geometry when viewed in a plane parallel with the centerline.

7. The assembly of claim 1, wherein at least a portion of the second end of the first inlet is angularly offset from and laterally overlaps at least a portion of the first end of the first inlet when viewed in a plane parallel with the centerline.

8. The assembly of claim 1, wherein
an entirety of the first end of the first inlet has a straight geometry; and
at least a portion of the second end of the first inlet has a non-straight geometry.

9. The assembly of claim 1, wherein at least a portion of the second end of the first inlet has an axially undulating geometry.

10. The assembly of claim 1, wherein
the first position is a forward position, and the second position is an aft position; and
the first end of the first inlet is a forward end of the first inlet, and the second end of the first inlet is an aft end of the first inlet.

11. The assembly of claim 1, wherein
the first end of the first inlet and the first end of the second inlet are formed by the inlet lip structure; and
the second end of the first inlet and the second end of the second inlet are formed in the annular sleeve.

12. The assembly of claim 11, wherein the first side of the first inlet and the second side of the first inlet are formed in the annular sleeve.

13. The assembly of claim 11, wherein the variable area inlet further comprises a fixed structure; and the annular sleeve is received within a receptacle of the fixed structure when the moveable structure is in the second position.

14. The assembly of claim 1, further comprising:
an inlet duct;
the first airflow inlet passage comprising an outer first airflow inlet passage, the second airflow inlet passage comprising an outer second airflow inlet passage, and the variable area inlet further comprising an inner airflow inlet passage at a forward end of the moveable structure; and
the inlet duct fluidly coupled with the inner airflow inlet passage when the moveable structure is in the second position, and the inlet duct fluidly coupled with the inner airflow inlet passage, the outer first airflow inlet passage and the outer second airflow inlet passage when the moveable structure is in the first position.

15. The assembly of claim 14, wherein the inlet duct is configured to direct air received from the inner airflow inlet passage, the outer first airflow inlet passage and the outer second airflow inlet passage into at least one of a core flowpath or a bypass flowpath of the aircraft propulsion system when the moveable structure is in the first position.

16. The assembly of claim 1, wherein
the second end of the first inlet has a non-straight geometry with a plurality of peaks and valleys laterally along the second end of the first inlet.

* * * * *